(12) United States Patent
Janle

(10) Patent No.: US 10,833,448 B2
(45) Date of Patent: Nov. 10, 2020

(54) UNDERWATER ELECTRICAL CABLE ASSEMBLY AND MODULAR ELECTRICAL CABLE SYSTEM

(71) Applicant: Tristan Janle, Queensland (AU)

(72) Inventor: Tristan Janle, Queensland (AU)

( * ) Notice: Subject to any disclaimer, the term of this patent is extended or adjusted under 35 U.S.C. 154(b) by 0 days.

(21) Appl. No.: 16/098,089

(22) PCT Filed: May 4, 2017

(86) PCT No.: PCT/AU2017/050410
§ 371 (c)(1),
(2) Date: Oct. 31, 2018

(87) PCT Pub. No.: WO2017/190194
PCT Pub. Date: Nov. 9, 2017

(65) Prior Publication Data
US 2019/0157796 A1    May 23, 2019

(30) Foreign Application Priority Data

May 4, 2016 (AU) ............................... 2016901635

(51) Int. Cl.
| | | |
|---|---|---|
| *H01R 13/523* | (2006.01) | |
| *H02G 15/14* | (2006.01) | |
| *H02G 15/23* | (2006.01) | |
| *H02G 15/24* | (2006.01) | |
| *H02G 15/32* | (2006.01) | |

(52) U.S. Cl.
CPC ........... *H01R 13/523* (2013.01); *H02G 15/14* (2013.01); *H02G 15/23* (2013.01); *H02G 15/24* (2013.01); *H02G 15/32* (2013.01)

(58) Field of Classification Search
CPC ...... H01R 13/523; H02G 15/14; H02G 15/23; H02G 15/24; H02G 15/32
See application file for complete search history.

(56) References Cited

U.S. PATENT DOCUMENTS

| | | | | |
|---|---|---|---|---|
| 2,967,899 | A | * 1/1961 | Priaroggia | H02G 15/24 |
| | | | | 174/22 R |
| 3,812,455 | A | * 5/1974 | Pearson | G01V 1/201 |
| | | | | 367/154 |
| 3,963,297 | A | 6/1976 | Panek et al. | |
| 4,225,746 | A | * 9/1980 | Ball | H02G 15/24 |
| | | | | 174/21 R |
| 4,363,168 | A | 12/1982 | Bryer et al. | |
| 4,530,075 | A | 7/1985 | Pearson | |

(Continued)

OTHER PUBLICATIONS

International Search Report & Written Opinion issued in PCT/AU2017/050410, dated Aug. 23, 2017.

*Primary Examiner* — Tho D Ta
(74) *Attorney, Agent, or Firm* — Insigne LLP

(57) ABSTRACT

A termination assembly including an elongate housing having at least one access port and an end adaptor on each opposing end, said end adaptor including a tube adaptor or a moulded cable end adaptor, a terminal block having a plurality of terminals, said terminal block is positionable within the elongate housing, a sealing sleeve for covering the elongate housing, and wherein the termination assembly is fillable with oil and forms part of a sealed electrical cable when connected via the end adaptors to tube containing a wiring loom and/or when connected to a moulded cable.

20 Claims, 5 Drawing Sheets

(56) References Cited

U.S. PATENT DOCUMENTS 5,645,438 A * 7/1997 Cairns .................. G02B 6/3816
439/139
2007/0089896 A1 4/2007 Stepniak et al.

* cited by examiner

UNDERWATER ELECTRICAL CABLE ASSEMBLY AND MODULAR ELECTRICAL CABLE SYSTEM

FIELD OF INVENTION

The present invention relates to electrical cables used underwater and at great depths. The present invention has particular but not exclusive application for use with remotely operated vehicles (ROVs). Reference to the use of electrical cabling of the present invention with respect to submersible ROVs is by way of example only and the invention is not limited to this example.

BACKGROUND OF THE INVENTION

Within the offshore oil and gas industry, most of the deep water work is carried out by ROVs. ROVs are electric or electro-hydraulic machines with many different interconnected systems. All submersible electrical systems are connected together using cables fitted with subsea plugs which provide a watertight seal into bulkhead sockets and provide the ROV or subsystem device with electrical power and signal paths.

Subsea electrical cabling is subject to a variety of stresses such as increased pressure with increasing water depth. Subsea electrical cabling must be made to withstand these stresses. There are two main types of subsea electrical cabling that address the particular issues of subsea operation. These are moulded rubber electrical cabling and oil-filled electrical cabling.

Moulded rubber electrical cabling is the industry standard. Moulded rubber electrical cables are relatively expensive and are difficult to modify and repair. Modification is quite common because of the many different wiring protocols of third party equipment or other ROV systems. After the cable is modified to suit electrical connector requirements, it is never to the same standard as an unmodified cable. The field technicians face the choice of either draining and opening oil-filled junction boxes (JBs) to temporarily rewire the circuit, opening the third party equipment with the risks of damage and removal of warranties, or as is most common, cutting the cable in half and performing a 'field splice' to ensure the electrical connection (or conductor matrix) is fixed. The quality and reliability of the field splice is dependent on the operator skill and equipment, and the modification is time consuming.

Furthermore, the moulded electrical cables are prone to water ingress which leads to reduced insulation and or shorting between electrical conductors. This generally occurs at the junction of the rubber cable sheath and the moulded section that encases the plug and is especially prevalent with cables that are subject to significant ongoing movement such as those attached to cameras on pan and tilt units.

Because of the failures of moulded electrical cables and the disadvantages of repairing or modifying them, cables are regularly replaced with new moulded cables making the use of these cables very expensive and wasteful.

As cables come in different lengths it is preferable to purchase longer cables as they can also be used for shorter lengths. Excess cable is typically coiled and secured by cable ties to the ROV. This excess cable provides additional unnecessary weight to the ROV. Further this can make access to sections extremely difficult and pose a potential hazard if the excess cable came loose and was caught on a subsea asset or a subsystem device of the ROV and interfering with or causing damage to its operation.

In addition, the orientation of the moulded cables is fixed. For example, when using a 90-degree moulded end, the direction that the cable exits from the moulded section in relation to the pin orientation is set. This means that if a slightly different angle is desired for clearance such as with a camera that has little rear space, a different cable must be used or the device needs to be modified to enable the attachment to be made. Consequently, moulded electrical cables have very limited flexibility in how they are attached to a device.

In contrast, oil-filled electrical cabling has generally been used as a temporary measure and is considered unreliable because of the difficulty to manufacture. Generally, electrical conductors are soldered together, the wire assembly is bent back to form a 'S' shape and inserted into the outer tubing before oil is introduced into the tube and the tube connected to the plug.

Often these oil-filled cables allow the ingress of water because there is a space within the tube that is not filled with oil because of the difficulty of completely filling the tube with oil. Additionally, the tube can become hard and brittle with age and UV light leading to reduced functionality and premature failure. Oil-filled electrical cables are generally unsightly, messy and unreliable and are not the preferred option by technicians.

OBJECT OF THE INVENTION

It is an object of the present invention to provide an electrical cabling system that overcomes at least in part one or more of the aforementioned problems and/or provide the consumer with a useful or commercial choice.

SUMMARY OF THE INVENTION

In one aspect, the present invention broadly resides in a termination assembly including an elongate housing having at least one access port and an end adaptor on each opposing end, said end adaptor including a tube adaptor or a moulded cable end adaptor;

a terminal block having a plurality of terminals, said terminal block is positionable within the elongate housing; and a sealing sleeve for covering the elongate housing;

wherein the termination assembly is fillable with oil and forms part of a sealed electrical cable when connected via the end adaptors to tube containing a wiring loom and/or when connected to a moulded cable.

Preferably the termination assembly has at least one sealable opening for filling the termination assembly with oil or for bleeding air from the termination assembly as the termination assembly is being filled with oil. Preferably the sealing sleeve has at least one sealable opening for filling the termination assembly with oil or for bleeding air from the termination assembly as the termination assembly is being filled with oil. In another embodiment, the sealing sleeve has at least two opposed sealable openings for filling the termination assembly with oil and/or for bleeding air from the termination assembly as the termination assembly is being filled with oil. In another embodiment, the elongate housing has the at least one sealable opening.

In another aspect, the present invention broadly resides in a termination assembly including an elongate housing having at least one access port and an end adaptor on each opposing end, said end adaptor including a tube adaptor or a moulded cable end adaptor;

a terminal block having a plurality of terminals, said terminal block is positionable within the elongate housing; and a sealing sleeve for covering the elongate housing, said sealing sleeve has two opposed sealable openings for filling the termination assembly with oil and/or for bleeding air from the termination assembly as the termination assembly is being filled with oil; wherein the termination assembly forms part of a sealed electrical cable when connected via the end adaptors to tubing containing a wiring loom and/or when connected to a moulded cable.

Preferably electrical wires of each wiring loom are connected to the terminals on the terminal block when the terminal block is positioned in the elongate housing. The connected wires preferably pass out of each corresponding end adaptor. It will be appreciated that wires may be referred to as electrical conductors.

The termination assembly can have two tube adaptors or a moulded cable end adaptor and a tube adaptor. Preferably each tube adaptor connects to a tube having a wiring loom. Preferably the moulded cable end adaptor connects to a moulded cable.

In a further embodiment, one or both of the end adaptors is forked enabling a three or more way electrical cable assembly.

In a further aspect, the present invention broadly resides in an electrical cable assembly including a termination assembly as described above;

a connection assembly with parts selected from one or more tubes and wiring looms, one or more moulded cable assemblies, one or more electrical connector assemblies, and one or more cable connector assemblies; wherein the selection of components depends on the type of electrical connector and the distance between the electrical connectors.

Where one or more tubes are used, they are preferably filled with oil to support the wiring loom.

The tubes and wiring looms can be of any desired or suitable length.

The electrical connector assemblies preferably comprise of parts that form a hydraulic seal with the termination assembly, tube or moulded cable, and facilitate an electrical connection between the wires of the wiring loom and an electrical connector.

Preferably the electrical connector assemblies are straight or angled to accommodate attachment to plugs/sockets and electrical connections on systems and devices such as cameras. In a preferred form, the electrical connector assemblies are angled at 0 degrees (that is in-line), 45 degrees, or 90 degrees relative to the direction of the tube and wiring loom.

In a further aspect, the present invention broadly resides in an electrical cable assembly including a termination assembly as described above;

a connection assembly including a first tube having a wiring loom, the first tube connectable to one of the end adaptors and a first tube connector assembly connected to the free end of the first tube to form a sealed oil-filled electrical cable.

Preferably the first tube connector assembly has a sealable opening. Preferably the sealable opening of the first tube connector assembly is for filling the termination assembly with oil and/or for bleeding air out of the termination assembly as the termination assembly is being filled with oil. More preferably the sealable opening of the first tube connector assembly is adapted to fill the termination assembly and/or the electrical cable assembly with oil and/or for bleeding air out as the termination assembly and/or the electrical cable assembly is being filled with oil.

Preferably the connection assembly further includes a second tube having a wiring loom, the second tube connectable to the other of the end adaptors and a second tube connector assembly connected to the free end of the second tube. In an alternate embodiment, the other of the end adaptors is connectable to a moulded cable end. Preferably the moulded cable is a moulded rubber or flexible plastic coated cable.

Preferably the second tube connector assembly has a sealable opening. Preferably the sealable opening of the second tube connector assembly is for filling the termination assembly with oil and/or for bleeding air from the termination assembly as the termination assembly is being filled with oil. More preferably the sealable opening of the second tube connector assembly is adapted to fill the electrical cable assembly with oil and/or bleed the electrical cable assembly as the electrical cable assembly is being filled with oil.

In another aspect, the present invention broadly resides in a modular electrical cable system including a termination assembly as described above;

one or more tubes having a wiring loom, or one or more moulded cables for connection to the termination assembly;

two or more electrical connector assemblies for connection to the tubes having wiring looms, or moulded cable.

Preferably if an electrical connector assembly connects to a tube, the electrical connector assembly has a sealable opening for filling the termination assembly with oil or for bleeding air from the termination assembly as it is being filled with oil.

Preferably the tube(s) is a/are flexible tube(s). In one embodiment, the tube(s) is a/are hose(s).

The features described with respect to one aspect also apply where applicable to all other aspects of the invention. Furthermore, different combinations of described features are herein described and claimed even when not expressly stated.

BRIEF DESCRIPTION OF THE DRAWINGS

In order that the present invention can be more readily understood reference will now be made to the accompanying drawings which illustrate a preferred embodiment of the invention and wherein.

DETAILED DESCRIPTION OF THE PREFERRED EMBODIMENT

Figure 1:
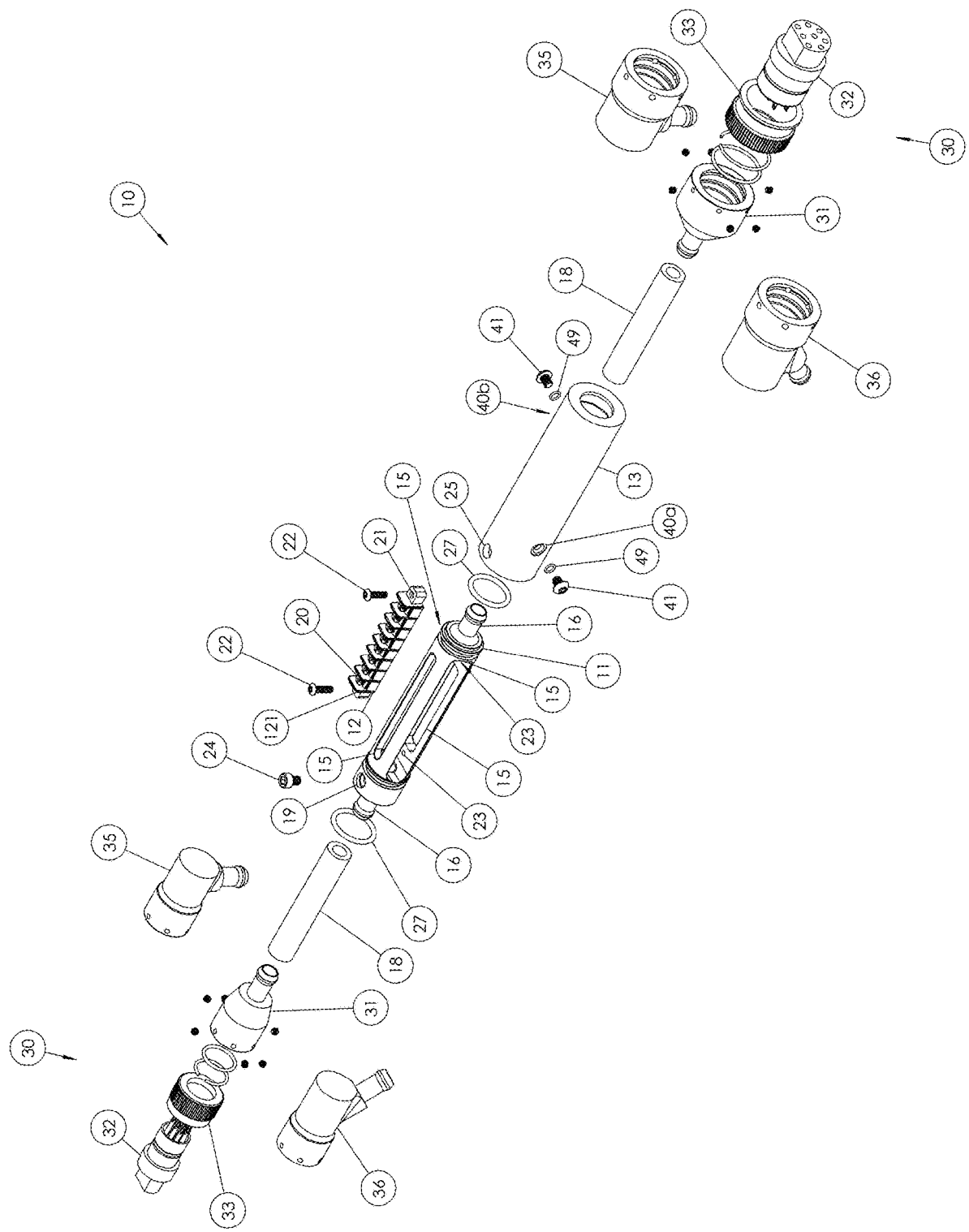
FIG. 1 is an exploded view of the preferred embodiment of the electrical cable assembly.

With reference to FIG. 1, there is shown an electrical cable assembly 10 including an elongate housing 11, terminal block 12 and a sealing sleeve 13. The elongate housing 11 is substantially cylindrical in shape having four elongate access ports 15. At each end of the elongate housing 11, there is a tube adaptor 16 which is connectable to flexible tube 18. At one end of the elongate housing 11 there is a threaded recess 19.

The terminal block 12 has a plurality of terminals 20 where different electrical conductors can be connected in order to form a desired electrical connection. The terminal block 12 has openings 21 at each end where a screw 22 passes through the openings 21 and fixes within complementary threaded openings 23 in the elongate housing 11.

The sealing sleeve 13 is substantially cylindrical in shape and can be positioned over the elongate housing 11 so that the elongate housing 11 is substantially contained therein. The tube adaptors 16 extend out through each end of the sealing sleeve 13. The sealing sleeve 13 is fixed in position over the elongate housing 11 by a fastener in the form of a positioning screw 24 through opening 25 adjacent the end of the sealing sleeve 13. The positioning screw 24 is retained in the opening 25 and threaded recess 19. The positioning screw 24 passes through opening 25 and is fixed within the threaded recess 19 on the elongate housing 11. There are O-rings 27 that form a seal between the elongate housing 11 and the sealing sleeve 13. The O-rings 27 on each end are of different sizes to assist with the installation of the sealing sleeve 13 on the elongate housing 11.

The flexible tubes 18 form part of the electrical cable assembly 10 and serve as conduits for the wiring looms. Each of the flexible tubes 18 can be of any suitable length depending on the desired length of the cable assembly to form the electrical connection between the connected equipment.

The electrical cable assembly 10 also includes two electrical connector assemblies 30 attachable at each free end of the flexible tubes 18. The electrical connector assemblies 30 attach to the end of the flexible tubes 18 and incorporate an electrical connector 32 for connection to electrical devices. The electrical connector assemblies 30 include connector adapter 31 and an electrical connector 32 which can include a threaded locking ring 33. The electrical connector 32 is sealingly fitted within the connector adapter 31. A wiring loom passes through the flexible tube 18, enters the connector adapter 31 and is terminated at the terminals at the rear of the electrical connector 32.

FIG. 1 shows two alternate connector adaptors 35 and 36. Connector adapter 35 positions the electrical connector 32 at right angles to flexible tube 18 whereas connector adapter 36 positions the electrical connector 32 at an angle of 45 degrees to the flexible tube 18. Different connector adapters 31, 35 and 36 will be used depending on the required configuration for the electrical connection. For example, a camera mounted on an ROV may require an electrical connection that allows the camera to move from side to side and up and down without interference, and this electrical connection may be achieved with a 45 degree angled connector adapter 36 or a 90 degree angled connector adapter 35. The connector adapters 31, 35 and 36 are of different sizes at each end, and are shown in FIG. 1 by way of example. In practice, the type and size of connector adapters 31, 35 and 36 will depend on the type and size of electrical connector used.

In use, it is relatively convenient and straight forward to disassemble the electrical cable assembly 10 and change conductor connections on the terminal block 12, change the length of the flexible tubes or replace flexible tubes, or change the electrical connector, type or size of connector adapter, or the complete electrical connector assembly.

Figure 3:
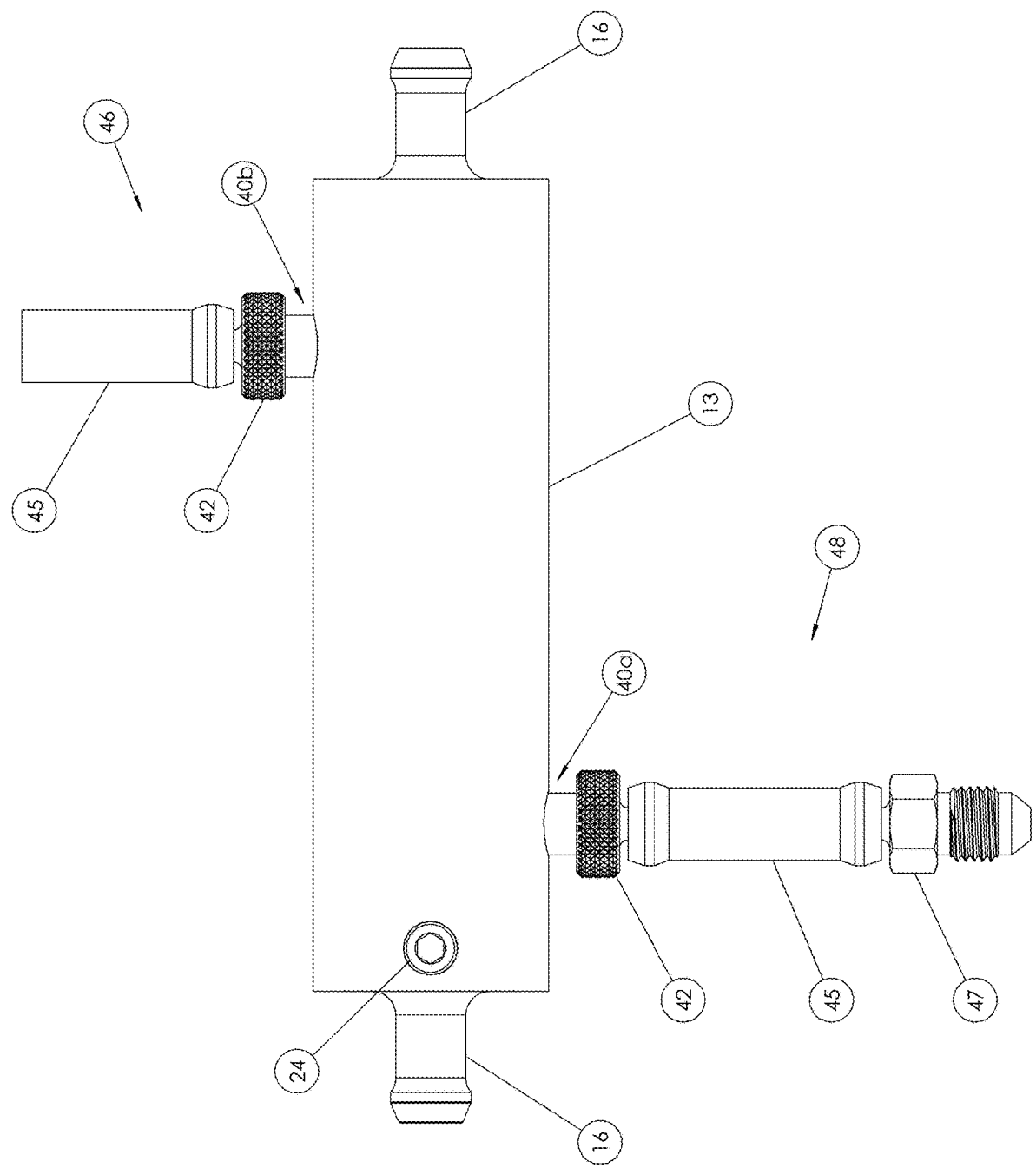
FIG. 3 is a diagrammatic front view of the assembled electrical cable assembly (without the wiring looms, flexible tubing or electrical connector assemblies). It is shown with the oil port adapters installed which are used for filling the electrical cable assembly with oil and bleeding air from the electrical cable assembly as it is being filled with oil. These are removed when the cable is in normal service.

With reference to FIGS. 1 & 3, there is shown an upper oil port 40b and a lower oil port 40a. In practice the oil ports are identical and can be used in either orientation.

To complete assembly of the electrical cable assembly 10, the sealing sleeve 13 is positioned over the elongate housing 11 and secured in place with the positioning screw 24. The two opposing and offset oil ports 40a,b are on the sealing sleeve 13. Oil is introduced into one of the oil ports 40a while the other oil port 40b remains open to allow air to escape. FIG. 3 shows the operation of filling the electrical cable assembly 10 with oil. In use, each of the tube adaptors 16 are connected to the flexible tubes 18 so that oil is introduced to the flexible tubes 18 and electrical connector assemblies 30 via the lower offset oil port 40a. Air is purged from the electrical cable assembly 10 via the upper offset oil port 40b. In practice, it is convenient to position a short tube section 45 on the oil port adapter 42 threaded into the upper offset oil port 40b forming an oil port exhaust assembly 46 to detect when the electrical cable assembly 10 is full of oil. The use of the oil port exhaust assembly 46 assists in preventing excess oil from passing out of the offset oil port 40b and across the elongate housing 13 reducing mess and waste.

Also in practice, it is convenient to position a short tube section 45 on the oil port adapter 42. The other end of the short tube section 45 is connected to a hydraulic fitting adapter 47. Items 42, 45 and 47 thus form an oil port filling assembly 48 which greatly assists in the introduction of oil into the oil port 40a.

Oil enters the sealing sleeve 13, passes into the elongate housing 11 and through the flexible tubes 18. Oil flows into the electrical connector assemblies 30 and stops where the electrical connector 32 is fixed and seals to the connector adapter 31, 35 and 36.

When the electrical cable assembly 10 is filled with oil, plugs 41 are passed through o-rings 49 and inserted into the oil ports 40a and 40b to seal the electrical cable assembly 10. The plugs 41 are screws which are threaded into the oil ports 40a and 40b. The oil in the electrical cable assembly 10 serves to protect the electrical connector assemblies, flexible tubes and termination assembly from collapse and water ingress in deep sea situations. The oil also lubricates the conductors of the wiring looms when the flexible tubes 18 are bent during normal operation.

In another embodiment, the termination assembly can connect an oil filled cable end to a moulded cable end. This will be achieved by replacing one of the tube adaptors with a high quality cable gland. The terminal block remains unchanged.

Figure 2:
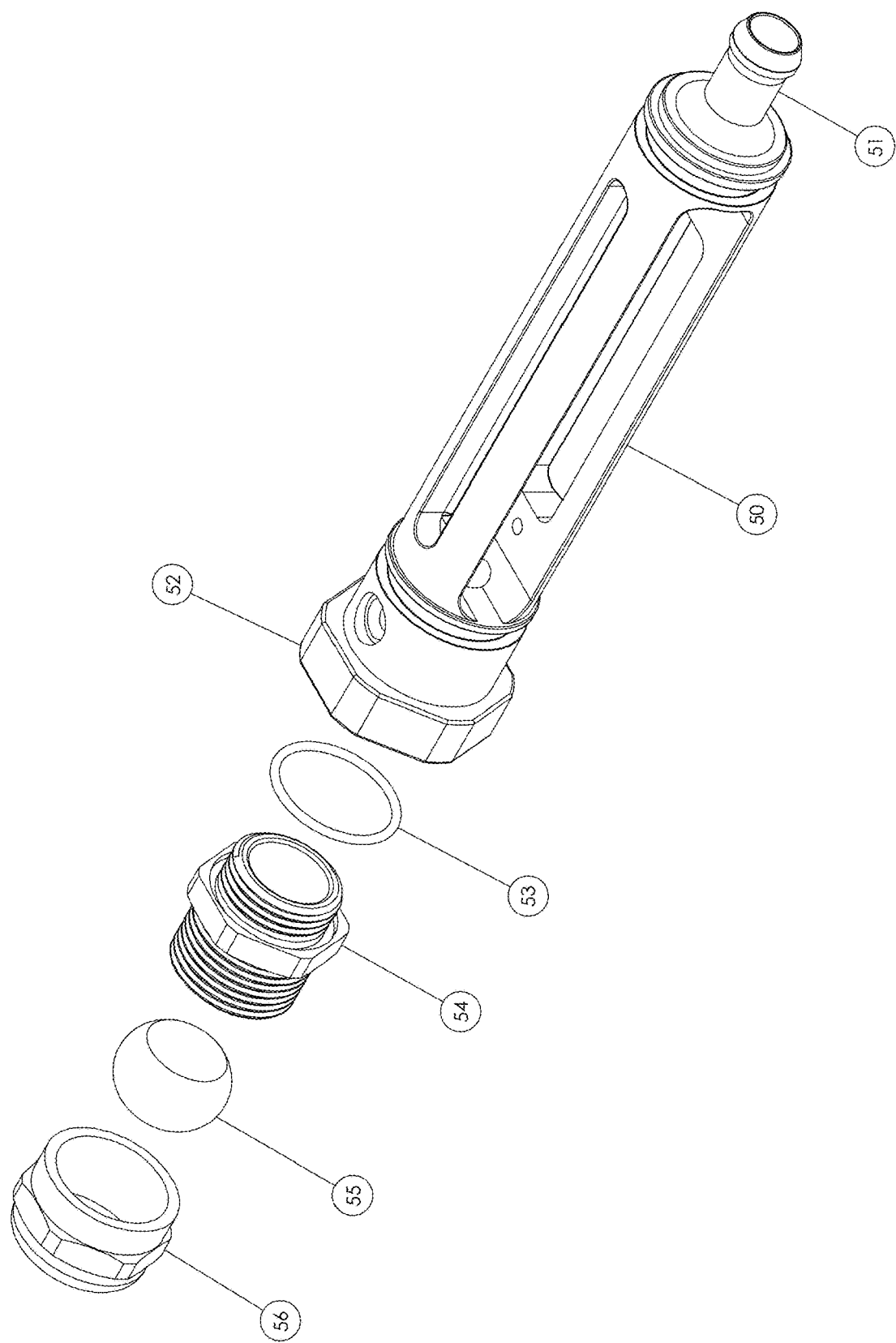
FIG. 2 is a diagrammatic view of an alternative elongate housing for the termination assembly.

With reference to FIG. 2 there is shown an alternate elongate housing 50 that has a tube adaptor 51 at one end. The other end 52 is machined to allow fitment of a high quality cable gland. Parts 56, 55, 54 and 53 form a typical high quality cable gland. In a further alternative embodiment, the elongate housing has an integral cable gland at one end.

In a further embodiment, the termination assembly can form a three or more way oil filled cable. This is useful for situations that run two or more connected devices such as lights off a single circuit.

In a further embodiment, the termination assembly can form a three or more way oil filled to moulded cable. This is useful for situations that run two or more connected devices such as lights off a single circuit, where the connected device use electrical connections that are incompatible with an oil filled cable.

Figure 4:
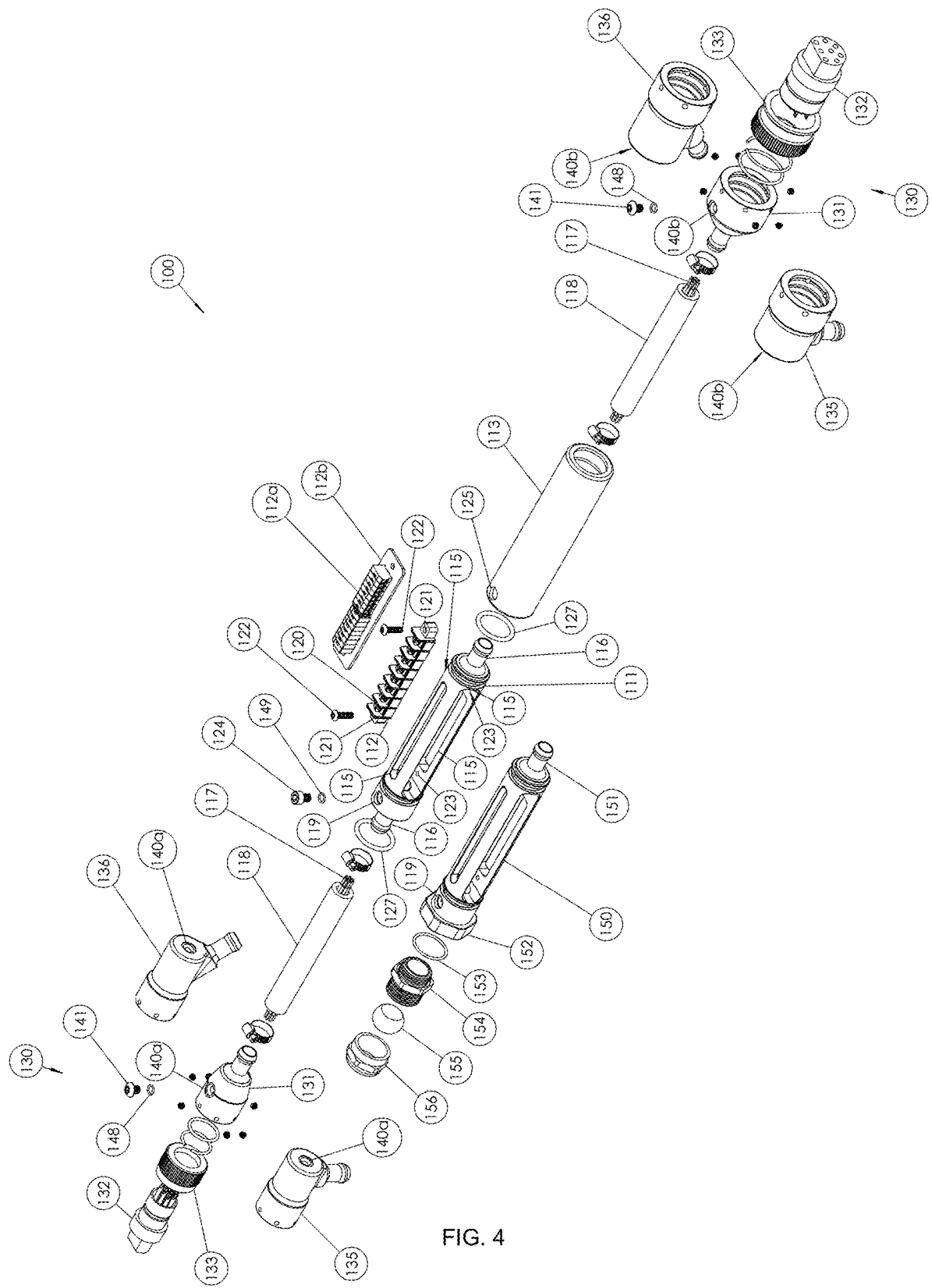
FIG. 4 is an exploded view of a preferred embodiment of the electrical cable assembly showing alternate components.

With reference to FIG. 4, there is shown an electrical cable assembly 100, which is similar to the electrical cable assembly as shown in FIG. 1. The electrical cable assembly 100 has an elongate housing 111, terminal block 112 and a sealing sleeve 113. The elongate housing 111 is substantially cylindrical in shape having four elongate access ports 115. At each end of the elongate housing 111, there is a tube adaptor 116 which is connectable to a flexible tube 118. At one end of the elongate housing 111 there is a threaded port 119.

There is also shown an alternate elongate housing 150 that has a tube adaptor 151 at one end. The other end 152 is machined to allow fitment of a cable gland (parts 156, 155, 154 and 153).

The terminal block 112 has a plurality of terminals 120 where different electrical conductors can be connected in order to form a desired electrical connection. The terminal block 112 has openings 121 at each end where a screw 122 passes through the openings 121 and fixes within complementary threaded openings 123 in the elongate housing 111. An alternate terminal block 112a is also shown. The alternate terminal block 112a is mounted on a circuit board 112b. Preferably, the alternate terminal block 112a affixes to the elongate housing 111 in a similar manner as the original terminal block 112.

The sealing sleeve 113 is positionable over the elongate housing 111. The tube adaptors 116 extend out through each end of the sealing sleeve 113. The sealing sleeve 113 is fixed in position over the elongate housing 111 by a positioning screw 124 through opening 125 adjacent the end of the sealing sleeve 113. The positioning screw 124 is similar to the positioning screw 24 shown in FIG. 1. The positioning screw 124 passes through O-ring 149 and opening 125 and is fixed within the threaded port 119 on the elongate housing 111. The positioning screw 124 and O-ring 149 seal the threaded port 119. O-rings 127 form a seal between the elongate housing 111 and the sealing sleeve 113. The O-rings 127 on each end are of different sizes to assist with the installation of the sealing sleeve 113 on the elongate housing 111.

The flexible tubes 118 form part of the electrical cable assembly 100 and serve as conduits for the wiring looms 117. Each of the flexible tubes 118 can be of any suitable length depending on the desired length of the wiring looms 117 to form the electrical connection between the connected equipment.

The electrical cable assembly 100 also includes two electrical connector assemblies 130 attachable at each free end of the flexible tubes 118. The electrical connector assemblies 130 attach to the end of the flexible tubes 118 and incorporate an electrical connector 132 for connection to electrical devices. The electrical connector assemblies 130 include connector adapter 131 and electrical connector 132 which can include a threaded locking ring 133. The electrical connector 132 is sealingly fitted within the connector adapter 131. Each wiring loom 117 passes through the flexible tube 118, enters the connector adapter 131 and is terminated at the terminals at the rear of the electrical connector 132.

There are also shown two alternate connector adaptors 135 and 136. The connector adapters 131, 135 and 136 as displayed are of different sizes at each end, and are shown by way of example. In practice, the type and size of connector adapters 131, 135 and 136 will depend on the type and size of electrical connector used.

The connector adapter 131, 135 and 136 have an upper threaded oil port 140b or a lower oil port 140a. The oil ports are identical and can be used in either orientation.

Figure 5:
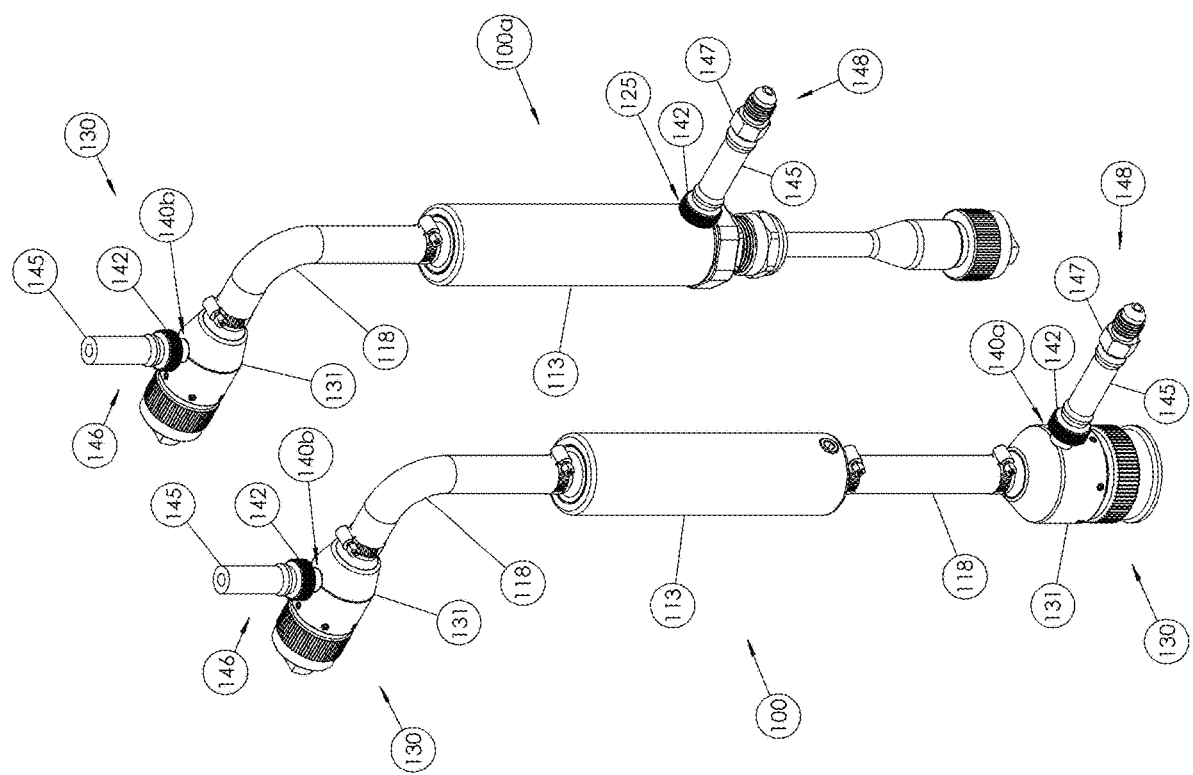
FIG. 5 is a diagrammatic view of assembled electrical cable assemblies with the oil port adapters installed which are used for filling the electrical cable assemblies with oil and bleeding air from the electrical cable assembly as it is being filled with oil. These are removed when the cables are in normal service.

To complete assembly of the electrical cable assembly 100, the sealing sleeve 113 is positioned over the elongate housing 111 and secured in place with the positioning screw 124. Preferably the electrical cable assembly 100 is then placed into an orientation similar to what is shown in FIG. 5, where one of the connector adaptors 131 containing an oil port 140b is physically higher than the majority of the remaining components of the electrical cable assembly 100. Oil is then introduced into the lowest oil port 140a while the highest oil port 140b remains open to allow air to escape.

FIG. 5 shows the operation of filling electrical cable assemblies 100 and 100a with oil. For electrical cable assembly 100 oil is introduced to the internal cavity of the assembly preferably via the lowest oil port 140a. Air is purged from the internal cavity of electrical cable assembly 100 preferably via the highest oil port 140b. In practice, it is convenient to position a short tube section 145 on the oil port adapter 142 threaded into the highest oil port 140b forming an oil port exhaust assembly 146 to detect when the electrical cable assembly 100 is full of oil. The use of the oil port exhaust assembly 146 assists in preventing excess oil from passing out of the highest oil port 140b reducing mess and waste.

Also in practice, it is convenient to position a short tube section 145 on the oil port adapter 142. The other end of the short tube section 145 is connected to a hydraulic fitting adapter 147. Items 142, 145 and 147 thus form an oil port filling assembly 148 which greatly assists in the introduction of oil into the lowest oil port 140a.

One or more plugs 141 and one or more O-rings 148 (as seen in FIG. 4) and a positioning screw 124 and O-ring 149 (as seen in FIG. 4) seal the electrical cable assembly 100 when it has been filled with oil. The plugs 141 are screws which are threaded into oil ports 140a,140b.

For electrical cable assembly 100a oil is introduced to the internal cavity of the assembly preferably via the threaded port 119, with access gained through opening 125 adjacent the end of the sealing sleeve 113, as the electrical cable assembly 100a does not have a second connector adaptor containing a threaded oil port as present in the electrical cable assembly 100. One or more plugs 141 and one or more O-rings 148 (as seen in FIG. 4) and a positioning screw 124 and O-ring 149 (as seen in FIG. 4) seal the electrical cable assembly 100a when it has been filled with oil.

It will be appreciated that lowest oil port 140a or opening 125 and threaded port 119 can be used to drain oil from the electrical cable assemblies 100,100a while the upper oil ports 140b can be used to introduce air into the assemblies 100,100a.

The oil in the electrical cable assembly 100 and 100a serves to protect the electrical connector assemblies, flexible tubes and termination assembly from collapse and water ingress in deep sea situations. The oil also lubricates the conductors of the wiring looms 117 when the flexible tubes 118 are bent during normal operation.

ADVANTAGES

The preferred embodiment of the present invention provides an advantage in that it allows relatively rapid modification to an electrical cable to suit a particular situation without compromising the standard of the cable, conductivity of, and insulation between the conductors of the wiring loom; and electrical connection to attached equipment. Modifications such as changes to physical length, plug orientation, plug type and size can be achieved with the present embodiment.

As well, the system of the preferred embodiment is cost effective as individual components can be changed without replacing the entire cable. Thus, the system is highly configurable to meet the requirements of an electrical system.

As the system is comparatively modular, modification does not require an experienced technician to perform the work.

VARIATIONS

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The invention claimed is:

1. A termination assembly including
   an elongate housing having at least one access port and an end adaptor on each opposing end, said end adaptor including a tube adaptor or a moulded cable end adaptor;
   a terminal block having a plurality of terminals, said terminal block is positionable within the elongate housing;
   a sealing sleeve for covering the elongate housing; and
   wherein the termination assembly is filled with oil that is free to flow throughout the termination assembly and forms part of a sealed electrical cable when connected via the end adaptors to tube containing a wiring loom and/or when connected to a moulded cable.

2. A termination assembly as claimed in claim 1, wherein said termination assembly has at least one sealable opening for filling the termination assembly with oil or for bleeding air from the termination assembly as the termination assembly is being filled with oil.

3. A termination assembly as claimed in claim 1, wherein said termination assembly has at least two opposed sealable openings for filling the termination assembly with oil or for bleeding air from the termination assembly as the termination assembly is being filled with oil.

4. A termination assembly as claimed in claim 2, wherein each of the at least one sealable opening is sealable with a plug.

5. A termination assembly as claimed in claim 4, wherein at least one of the plugs secures the sealing sleeve to the elongate housing.

6. A termination assembly as claimed in claim 4, wherein the plug is a screw.

7. A termination assembly as claimed in claim 1, wherein electrical conductors of the wiring loom are connected to the terminals on the terminal block when the terminal block is positioned in the elongate housing.

8. A termination assembly as claimed in claim 7, wherein the connected conductors pass out of one or more corresponding end adaptor.

9. A termination assembly as claimed in claim 1, wherein the end adaptors are two tube adaptors.

10. A termination assembly as claimed in claim 1, wherein the end adaptors are a moulded cable end adaptor and a tube adaptor.

11. A termination assembly as claimed in claim 1, wherein one or both of the end adaptors are forked to enable a three or more way electrical cable assembly.

12. An electrical cable assembly including
    a termination assembly as claimed in claim 1; and
    a connection assembly including a first tube having a wiring loom, the first tube connectable to one of the end adaptors and a first tube connector assembly connected to the free end of the first tube to form a sealed oil-filled electrical cable.

13. An electrical cable assembly as claimed in claim 12, wherein the first tube connector assembly has a sealable opening for filling the termination assembly with oil or for bleeding air from the termination assembly as the termination assembly is being filled with oil.

14. An electrical cable assembly as claimed in claim 12, further including a second tube having a wiring loom, the second tube connectable to the other of the end adaptors and a second tube connector assembly connected to the free end of the second tube.

15. An electrical cable assembly as claimed in claim 14, wherein the second tube connector assembly has a sealable opening for filling the termination assembly with oil or for bleeding air from the termination assembly as the termination assembly is being filled with oil.

16. An electrical cable assembly as claimed in claim 12, wherein the other of the end adaptors is connectable to a moulded cable.

17. An electrical cable assembly as claimed in claim 16, wherein the moulded cable is a moulded rubber or a flexible plastic coated cable.

18. An electrical cable assembly including
    a termination assembly as claimed in claim 1; and
    a connection assembly with parts selected from one or more tubes having wiring looms, one or more moulded cable assemblies, one or more electrical connector assemblies, and one or more cable connector assemblies;
    wherein the selection of components depends on the type of electrical connector and a distance between the electrical connectors.

19. A modular electrical cable system including
    a termination assembly as claimed in claim 1;
    one or more tubes having a wiring loom, or one or more moulded cables for connection to the termination assembly; and
    two or more electrical connector assemblies for connection to the tubes or moulded cable.

20. A modular electrical cable system as claimed in claim 19, wherein the electrical connector assemblies which connect to a tube have a sealable opening for filling the electrical cable system with oil or for bleeding air from the electrical cable system as it is being filled with oil.

* * * * *